(No Model.)
G. H. INGHRAM.
DRAFT EQUALIZER.
No. 375,357. Patented Dec. 27, 1887.
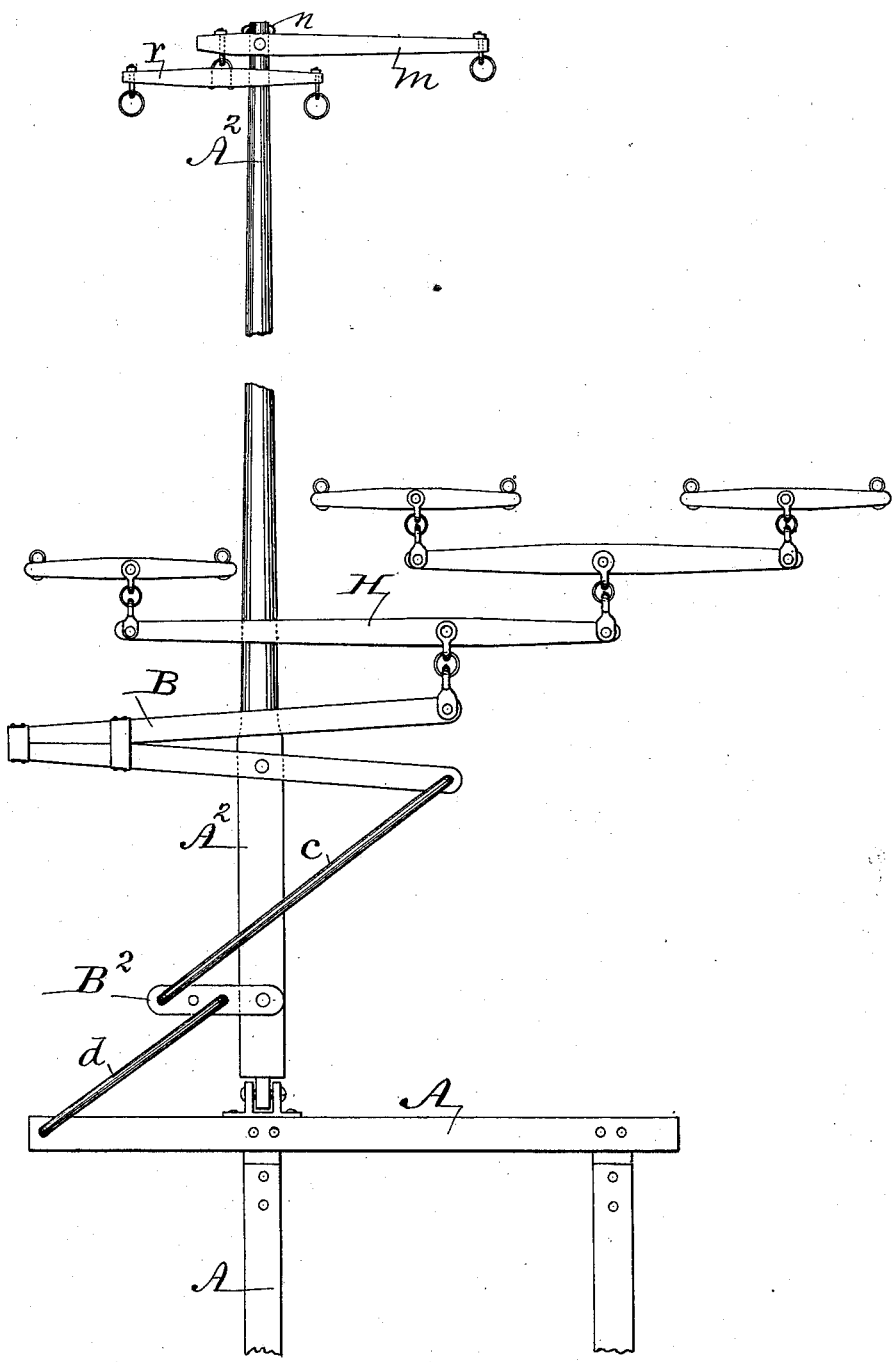
Witnesses:
R. H. Orwig
John Collie
Inventor:
George H. Inghram
By Thomas G. Orwig, Attorney

UNITED STATES PATENT OFFICE.

GEORGE H. INGHRAM, OF MENLO, IOWA.

DRAFT-EQUALIZER.

SPECIFICATION forming part of Letters Patent No. 375,357, dated December 27, 1887.

Application filed April 19, 1887. Serial No. 235,312. (No model.)

*To all whom it may concern:*

Be it known that I, GEORGE H. INGHRAM, a citizen of the United States of America, and a resident of Menlo, in the county of Guthrie and State of Iowa, have invented a Side-Draft Regulator for Reapers, &c., of which the following is a specification.

My invention consists in the construction and combination of a V-shaped lever and side-draft regulator, a three-horse evener, and a triple-pole yoke with a pole and a reaper and binder, as hereinafter set forth, in such a manner that three horses abreast will apply their united draft-force at one side of the pole and centrally relative to the resisting force met by the machine as required to overcome side draft in the advance of a reaper, and also in such a manner that the three horses will be yoked to the pole to prevent the pole from lashing and to unite their hold-back force in checking an advance and in making a backward movement.

A represents an auxiliary frame or draft-bar of a reaper to which a pole, $A^2$, is hinged.

B is a V-shaped lever pivoted to the pole.

$B^2$ is a short straight lever pivoted to the rear end of the pole and flexibly connected with the rear end of the lever B by means of a rod, $c$, and with the frame A by a rod, $d$.

H represents a three-horse evener of common form, flexibly connected with the front end of the lever B in such a manner that the force applied by three horses hitched to the evener will be transmitted through the levers B and $B^2$, and the rods $c$ and $d$ to the opposite side of the pole, and to the frame A at the point where the rod $c$ is connected therewith.

The rod $c$ can be adjustably connected with the lever $B^2$ by means of perforations in said lever, or it may be dispensed with and the rod $b$ extended to the frame A.

$m$ is a lever of the first order, detachably connected with the front end of the pole A by means of a ring, $n$, that is swiveled to the lever and slipped over the end of the pole in a common way.

$r$ is a yoke-bar flexibly connected with the short arm of the lever $m$ in such a manner that when the horses are connected with its ends and a third horse connected with the end of the long arm of the lever $m$ the joint hold-back force of the three horses will be applied to the pole and equalized and the pole prevented from lashing and chafing the horses on its opposite sides.

I claim as my invention—

1. The frame A, the pole $A^2$, the levers B and $B^2$, the rods $c$ and $d$, and an evener, H, arranged and combined with a reaper, substantially as and for the purposes specified.

2. The improved draft-regulator, consisting of a V-shaped lever pivoted to a pole and flexibly connected with the carriage of a reaper, an evener connected with the front portion of the said lever, and a triple yoke connected with the front end of the pole, to operate in the manner set forth, for the purposes stated.

GEORGE H. + INGHRAM.
<sub>his</sub> <sub>mark</sub>

Witnesses:
A. H. GRISELL,
L. MANUELL.